L. P. HYNES.
THERMOSTAT.
APPLICATION FILED APR. 16, 1918.
1,293,786.
Patented Feb. 11, 1919.
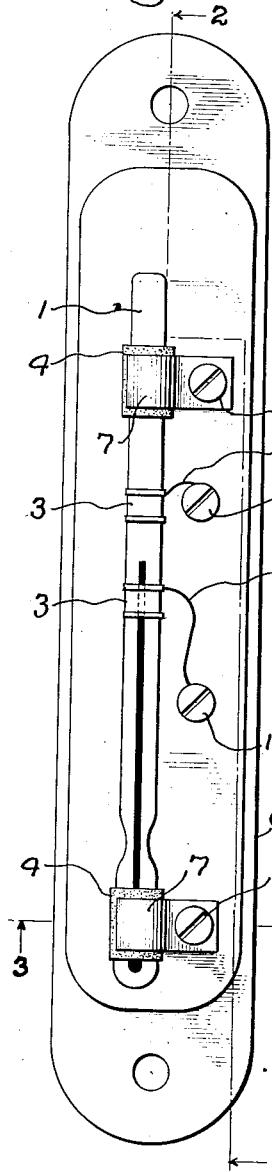
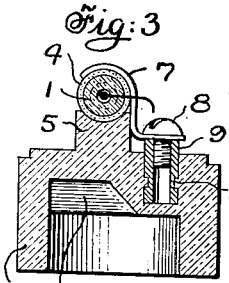
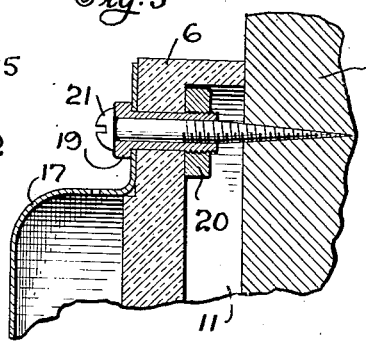
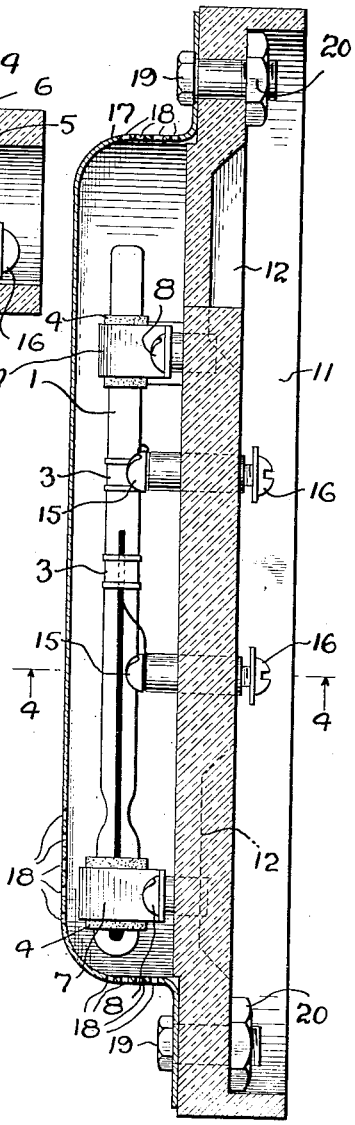
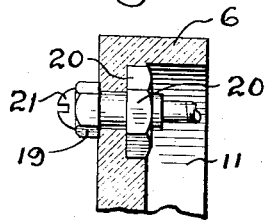
Lee P. Hynes, Inventor
By his Attorneys

UNITED STATES PATENT OFFICE.

LEE P. HYNES, OF ALBANY, NEW YORK, ASSIGNOR TO CONSOLIDATED CAR-HEATING COMPANY, OF ALBANY, NEW YORK, A CORPORATION OF WEST VIRGINIA.

THERMOSTAT.

1,293,786.  Specification of Letters Patent.  Patented Feb. 11, 1919.

Application filed April 16, 1918. Serial No. 228,910.

*To all whom it may concern:*

Be it known that I, LEE P. HYNES, a citizen of the United States, and a resident of the city of Albany, county of Albany, and State of New York, have invented an Improvement in Thermostats, of which the following is a specification.

My invention relates to improvements in thermostats or fluid thermometers, or similar devices, and has for its object to improve the construction of such apparatuses and more particularly the mountings thereof.

My invention aims to provide a structure which is simple and compact, has the fewest number of parts, and is readily accessible for repair. I also provide a structure in which the tube element of the thermostat or thermometer is rigidly supported in such a manner as to prevent movement thereof, but at the same time minimize the danger of breakage, due to shock and vibration. The construction is also such that electrical connections may be made with the greatest possible ease and the delicate parts of the apparatus can not readily be tampered with by unauthorized persons.

In the drawings, which are illustrative merely of the preferred embodiment of my invention, and which should not be taken as showing the only form in which my invention may be embodied, I have shown, In Figure 1, a front view of my improved thermostat with the cover removed;

In Fig. 2, a longitudinal sectional view thereof on line 2—2 of Fig. 1;

In Fig. 3, a sectional view taken upon the line 3—3 of Fig. 1;

In Fig. 4, a sectional view taken upon the line 4—4 of Fig. 2;

In Figs. 5 and 6, detail sectional and front views, respectively, of the fastening means employed; and In Fig. 7, a sectional view of a modified form of fastening means.

I have chosen to illustrate my invention in connection with a mercury thermostat, such as is commonly used for the control of electric heating apparatus in street railway cars, but it will be understood that my invention any many of the features thereof may be employed in connection with thermometers or apparatus of a similar character.

1 indicates the glass thermometer tube element of the thermostat, in which is fused a pair of contacts, to which connection is made by the lead wires 2—2. Lead wires 2—2 are held firmly in place by means of bands 3—3 of any suitable material, wound around the thermometer tube 1, or otherwise secured thereto.

Surrounding the thermometer tube 1 is a pair of cushion members 4—4 of resilient material, such as rubber tubing. The cushion members 4—4 rest in the concave extremities of projections 5—5 formed upon the base of insulating material 6, and are held against the extremities of the projections by clips 7—7, which are preferably of spring material, such as sheet steel. Clips 7—7 are held to the base by fastening means, which comprise screws 8 coöperating with screw threaded members 9 which are held in the base 6, as by molding or otherwise. I preferably form the screw threaded members in the form of an interiorly threaded tube having a suitable depression 10, or other means for preventing the member from pulling out of the insulating base.

The insulating base 6 is provided with a recessed portion 11 extending substantially the entire length of the base and a pair of recesses 12—12, of greater depth, located adjacent the ends of the base. Recess 11 provides a convenient place for the passage of the wires of the external leads leading to the thermostat, and allows any excess of wire to be coiled up within it. Recesses 12—12 permit of the egress of the external leads from conduits, and recesses are provided at both ends of the base, in order to permit a choice of two locations for an outlet of the conduit.

Connecting members are provided for connecting the leads 2—2 with the external leads, which connecting members comprise screw threaded members which are mounted within the base and extend therethrough, having both of their extremities screw threaded. I prefer to use the form of member illustrated in Fig. 4, in which a tubular member 13, having interiorly screw threaded extremities is held in the base, as by molding or otherwise, and is provided with a depression 14, or other suitable means, to prevent its pulling through. Screw 15 is used to connect to leads 2 and screw 16 is used to connect to the external leads.

A cover 17 of sheet metal or other suitable material is provided to extend over the thermometer element and its associated connections. Cover 17 is preferably perforated, as at 18, to permit the entry of air to the casing, and is attached to the base by means of bolts 19. Bolts 19 are preferably hollow and are provided at their outer ends with heads which engages cover 17, and at their inner ends with nuts 20. If desired, the construction shown in Fig. 7 may be used, wherein the nut 20 is held in a recess in the base, so that the cover may be tightened by turning the exterior end head of the bolt 19. In the modification shown in Fig. 7, the nut 20 may be either permanently held in the base 6, or may be merely held against turning. To fasten the entire structure to a supporting member, such as the side of a car, a screw 21 passes through the hollow bolt 19 into the supporting member 22. It will be seen that the construction is such that the cover can not be removed until the entire apparatus has been removed from its support by the loosening of the screw fastening means 21, and that it will be consequently difficult for unauthorized persons to tamper with the apparatus. When, however the apparatus has been removed from its support, it will be seen that the cover may be easily removed and that owing to the means used for supporting the thermostat tube and making the electrical connections, the parts of the apparatus may be easily and quickly removed for repair or replacement. It will also be noted that owing to the recessed construction of the base, a convenient means of using the conduit connections which are entirely concealed by the apparatus when in place is provided.

My improved construction also provides means for preventing injury to the thermostat by the intentional or accidental crushing of the cover 17, and I am thus enabled to make the cover of lighter material than would otherwise be possible. The base 6 is provided with a raised portion 22, which is substantially the shape of the cover and against which the sides of the cover fit. When the cover is held in place as described above, it is then impossible for articles to be inserted under the edge thereof at the sides and the free edge of the cover is supported by the raised portion 22 of the base.

While I have only described one form of my improved apparatus, I do not wish to be limited to the particular form described, since it will be evident that many changes may be made without departing from the spirit of my invention.

What I clam is:

1. In a mounting for fluid thermometers and the like, a base, a plurality of concave projections thereon, a plurality of spring clips adapted to coöperate with the projections to hold the thermometer thereon, and means for securing the clips to the base.

2. In a mounting for fluid thermometers and the like, a base, a plurality of concave projections thereon, a plurality of tubular cushions of resilient material adapted to surround the thermometer tube, and a plurality of curved clips adapted to hold the cushions against the concave surface of the projections.

3. In a mounting for fluid thermometers and the like, a base, a plurality of concave projections thereon, a plurality of tubular cushions of resilient material adapted to surround the thermometer tube, a plurality of curved clips adapted to hold the cushions against the concave surface of the projections, and means for detachably securing the clips to the base.

4. A thermostat mounting comprising a base of insulating material, a plurality of projections thereon, a plurality of clips adapted to hold the thermostat upon the projections, means for holding said clips carried by the base, and a plurality of electrically connecting members mounted in the base and projecting therethrough.

5. A thermostat mounting comprising a base of insulating material, a plurality of projections thereon having concave extremities, a plurality of tubular cushion members adapted to surround the thermostat tube, a plurality of clips adapted to hold the cushion members against the concave extremities of the projections, holding means for the clips including threaded members mounted upon the base, and a plurality of electrically connecting members passing through the base and having a screw thread at each extremity.

6. A thermostat mounting, comprising a base, a cover and means for fastening the cover to the base and the base to a support, comprising a tubular bolt passing through the cover and base, and a screw member passing through the bolt into the support.

7. A thermostat mounting, comprising a base, a cover and means for fastening the cover to the base and the base to a support, comprising a tubular bolt passing through the cover and base and provided with a head adapted to engage the cover, a nut coöperating with the bolt at its opposite end, and a screw adapted to pass through the bolt into engagement with the support.

8. A thermostat mounting, comprising a base having a recess extending substantially the entire length of the base, a pair of recessed portions of greater depth adjacent the ends of the mounting, and a plurality of electrically connecting members extending through the base between the recessed portions of greater depth.

9. A thermostat mounting, comprising a base having a recess extending substantially the entire length of the base, a pair of recessed portions of greater depth adjacent the ends of the mounting, and a cover securing member passing through the base adjacent each end of the base and between the recessed portions of greater depth and the ends of the base.

10. A thermostat, comprising a hollow base of insulating material, a plurality of concave projections thereon, a thermostat tube, a plurality of tubular cushioning members of resilient material surrounding the tube, metallic clips adapted to partially surround the cushioning members and hold the tube in position upon the projections, clip holding means comprising screw threaded members carried by the base, a plurality of electric contacts penetrating the tube, lead wires extending therefrom, and connecting means for said lead wires comprising screw threaded members carried by the base and extending therethrough.

11. In a mounting for fluid thermometers and the like, a base, means for supporting the thermometer spaced away from the base, terminal connections for said thermometer, a cover protecting said thermometer and terminal connections and attached to said base, and means to support the sides of said cover, said means preventing the sides from being crushed inwardly against the thermometer or the connections.

12. In a thermostat mounting, a base, a thermometer tube carrying electric contacts, cushioning devices physically connecting the thermometer tube to the base, and flexible electric connections leading from the thermostatic contacts to circuit terminals.

13. In a thermostat mounting, a base, a thermometer tube carrying electric contacts arranged to be closed and opened by the expansion and contraction of the liquid in the thermometer, cushioning devices connecting the thermometer tube to the base, circuit terminals passing through the base and arranged for attachment to wires upon both sides of the base, and flexible electrical connections leading from the thermometer contacts to the anterior side of the circuit terminals.

In testimony whereof I have signed my name to this specification this 10th day of April, 1918.

LEE P. HYNES.